(12) United States Patent
Ammicht et al.

(10) Patent No.: US 6,549,673 B1
(45) Date of Patent: Apr. 15, 2003

(54) WAVELET-BASED COMPRESSION OF IMAGES FOR STORAGE, TRANSMISSION AND RECONSTRUCTION USING HIERARCHICAL SUBBAND DECOMPOSITION

(75) Inventors: Egbert Ammicht, Budd Lake, NJ (US); Paul David Davis, Mount Tabor, NJ (US); Richard Robert Shively, Convent Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/429,467

(22) Filed: Oct. 28, 1999

(51) Int. Cl.[7] .................................................. G06K 9/46
(52) U.S. Cl. ........................ 382/240; 382/232; 382/233
(58) Field of Search ................................ 382/240, 233, 382/232, 239; 375/240.08, 240.05; 358/1.9

(56) References Cited

U.S. PATENT DOCUMENTS

| | | | |
|---|---|---|---|
| 5,315,670 A | | 5/1994 | Shapiro ........................ 382/240 |
| 5,412,741 A | * | 5/1995 | Shapiro ........................ 382/232 |
| 5,748,786 A | * | 5/1998 | Zandi et al. .................. 382/240 |
| 5,764,807 A | | 6/1998 | Pearlman ...................... 382/240 |
| 5,982,938 A | * | 11/1999 | Dube ............................ 382/240 |
| 6,160,846 A | * | 12/2000 | Chiang et al. ............. 375/240.05 |

OTHER PUBLICATIONS

Polyak et al., "Wavelet Decomposition and Reconstruction Using Arbitrary Kernels: A New Approach", IEEE Image Processing, vol. 3, 1998, pps. 866–870.*
Kim et al., "An Embedded Wavelet Video Coder . . . Hierarchical Trees", IEEE Data Compression Conference, 1997, pps. 251–260.*
Said et al., "Image Compression Using the Spatial–Orientation Tree", IEEE Circuits and Systems, vol. 1, 1993, pps. 279–282.*

* cited by examiner

Primary Examiner—Anh Hong Do
(74) Attorney, Agent, or Firm—Charles E. Graves

(57) ABSTRACT

Data compression achieved by set partitioning of hierarchical trees is made more efficient by a family of related traversal schemes which act upon the tree structure and the significance values derived from the tree structure. The tree structure may be traversed in any of a number of sequences. In accordance with significance tests applied to the node data, bits are produced or not. The order in which the bits are produced may be freely chosen. Trees are traversed and bits are emitted which describe the relative magnitude of coefficients in the sub-trees of the current tree-node. The manner of traversal can either be known to the remote decoder or can be derived from the incoming data stream. The encoding scheme typically specifies all bits emitted by a given node v as a function of the traversal of its parents, the bit-plane b, the coefficient value c of v, the significances $B_1(v)$ and $B_2(v)$, and whether the parent node p still emits $B_2(p)$.

6 Claims, 8 Drawing Sheets

POST PROCESSOR BIT RE-ORDERING

THE ORIGINATING NODE OF BITS IN THE ENCODER
BIT-STREAM OUTPUT AS A FUNCTION OF BIT-PLANE
AND BIT NUMBER FOR THE REFERENCE

TRAVERSE BY "SIBLINGS FIRST, THEN SUB-TREES"

|  | BOTH | 756 x 512 | 1920 x 1088 |  |
|---|---|---|---|---|
| AVERAGE DIFFERENCE | 0.38 | 0.55 | 0.34 | DB |
| STD DEVIATION | 0.17 | 0.09 | 0.16 | DB |
| MAX | 0.72 | 0.72 | 0.62 | DB |
| MIN | 0.01 | 0.46 | 0.01 | DB |

COMPARISON OF PSNR VALUES ACHIEVED BY THE
SPIHT AND LIFTS REFERENCE ALGORITHMS

FIG. 9

WAVELET-BASED COMPRESSION OF IMAGES FOR STORAGE, TRANSMISSION AND RECONSTRUCTION USING HIERARCHICAL SUBBAND DECOMPOSITION

TECHNICAL FIELD

This invention relates to techniques for data compression to realize more efficient data storage and transmission. More particularly, the invention is a family of processes which comprise a generalization of set partitioning in hierarchical trees for image compression that is computationally less complex and requires less memory overhead.

BACKGROUND OF THE INVENTION

Wavelet-based compression of images for storage and transmission involving hierarchical subband decomposition is an attractive way for achieving needed computational and coding efficiency. A desirable property of compression schemes is that if the compressed bit stream is truncated at an arbitrary point, the bit stream contains a lower rate representation of the image. Consequently, bits are transmitted in the order of importance. This embedded property can be applied, for example, to budget a fixed number of bits per frame, such as in constant frame-rate synchronous bit rate video communications. It further allows coding to be terminated when a given distortion metric is met, as in archiving images.

One of the prior art approaches for compressing the wavelet coefficient array by exploiting its statistical properties, is a process known as set partitioning in hierarchical trees (hereinafter, "SPIHT"). The process is described in U.S. Pat. No. 5,764,807 to Pearlman et. al., issued June, 1998. SPIHT in turn is a refinement of a process known as Embedded Zerotree Wavelet ("EZW") which is described in U.S. Pat. No. 5,315,670 to Shapiro, issued June 1994. These patents to the extent relevant are hereby incorporated by reference. By structuring the data in hierarchical tree sets that are likely to be highly correlated, the EZW process exploits the self-similarity of the wavelet transform at different scales. Pearlman et. al. teaches the further partitioning of the data into lists, to gain additional compression.

More specifically, the scheme of U.S. Pat. No. 5,764,807 requires partitioning the wavelet coefficients into a number of lists, with list membership changing as the execution proceeds, and in some cases involving dual membership of a coefficient in different lists. The constantly changing list memberships are difficult and expensive to maintain. Direct implementation of the process unavoidably requires an inner loop of execution that involves the steps "read value and list membership information, compute significance information, derive and output encoding bits, and modify and save new list membership information". The memory to preserve list membership information, the instructions to compute new list membership information, and I/O traffic (bandwidth) to save and retrieve that information, all contribute to process overhead and execution time.

With the above-described protocol, the execution speed of the processing on available DRAM hardware is slow. Implementing the SPIHT process in the manner described in U.S. Pat. No. 5,764,807 for HDTV-rate compression for example, requires memory access rates that are close to the limits of currently available commercial DRAM devices.

Therefore, a need exists for a compression scheme which can execute faster, thus accommodating the size and rate of available memory technology, and yet achieve the SPIHT level of performance.

SUMMARY OF THE INVENTION

It has been realized that more efficient compression may be gained by considering simply the tree structure and the significance values derived from the tree structure. In this conceptualization, lists are not needed. Bits are produced in any order desired, not in the order dictated by use of lists. Trees are traversed and bits are emitted to describe the relative magnitude of coefficients in the sub-trees of the current tree-node, in some appropriate way that is either known to the decoder or that can be derived by the decoder. Rather than accessing each Wavelet coefficient and associated parameters numerous times to generate an output, the invention teaches accessing each coefficient in a predetermined order. All bits emitted by a given node are produced as soon as that node is examined. Advantageously, the encoding itself (i.e., the bits that are emitted as well as the case of emitting no bits until a defined significance is detected) is essentially the same as that used in SPIHT.

In one embodiment, the traversal process produces relevant bits in a given tree before moving on to the next tree, in a scheme of "subtrees first, then siblings". It is more advantageous in certain circumstances to use a traversal scheme in which siblings of the current node are traversed, and thereafter the subtrees down from the current node are traversed. Alternatively, it may be advantageous to encode certain sub-trees only; or choose to refine some subset of nodes based on a variety of criteria, such as precomputed metrics or image subsets of particular interest. Traversal algorithms may be varied, e.g., pre-order and in-order. Variations on the process allow accessing the coefficients only once, or once per bit-plane. A further variation is to separate the produced bits into output queues for further reordering or other processing. For example, it may be of interest to use three output queues dependent in part on whether the current node was already emitting value v bits in the previous plane.

The fact that the magnitudes of the coefficients in the hierarchical tree data organization tend to decrease with depth is exploited by a coding scheme that uses specific definitions of significance for sets of transform coefficients. We define the significance $B(v)$ of the coefficient associated with a node v to be the position of its most significant bit. We similarly define $B(V)$ for a set of nodes V to be the maximum significance of all the nodes in the set. Two of the sets associated with a given node v are of particular interest: the set $D_1(v)$ of all descendants of v, and the set $D_2(v)$ of all grandchildren of v and their descendants. The associated significances $B_1(v)=B(D_1(v))$ and $B_2(v)=B(D_2(v))$ can be precomputed for all nodes in any given tree. The encoding scheme then specifies all bits emitted by a given node v as a function of the traversal of its parents (i.e., the node is reached), the bit-plane b, the coefficient value c of v, the significances $B_1(v)$ and $B_2(v)$, and whether the parent node p still emits $B_2(p)$.

DESCRIPTION OF THE DRAWING

FIG. 9 is a table measuring performance of the inventive embodiment described in Appendices A and B relative to the SPIHT process.

DETAILED DESCRIPTION OF AN ILLUSTRATIVE EMBODIMENT

The invention will be described in the context of an end-to-end video system; but it is understood that the advanced compression techniques of the invention may be practiced in other applications such as use in a storage system.

Figure 1:
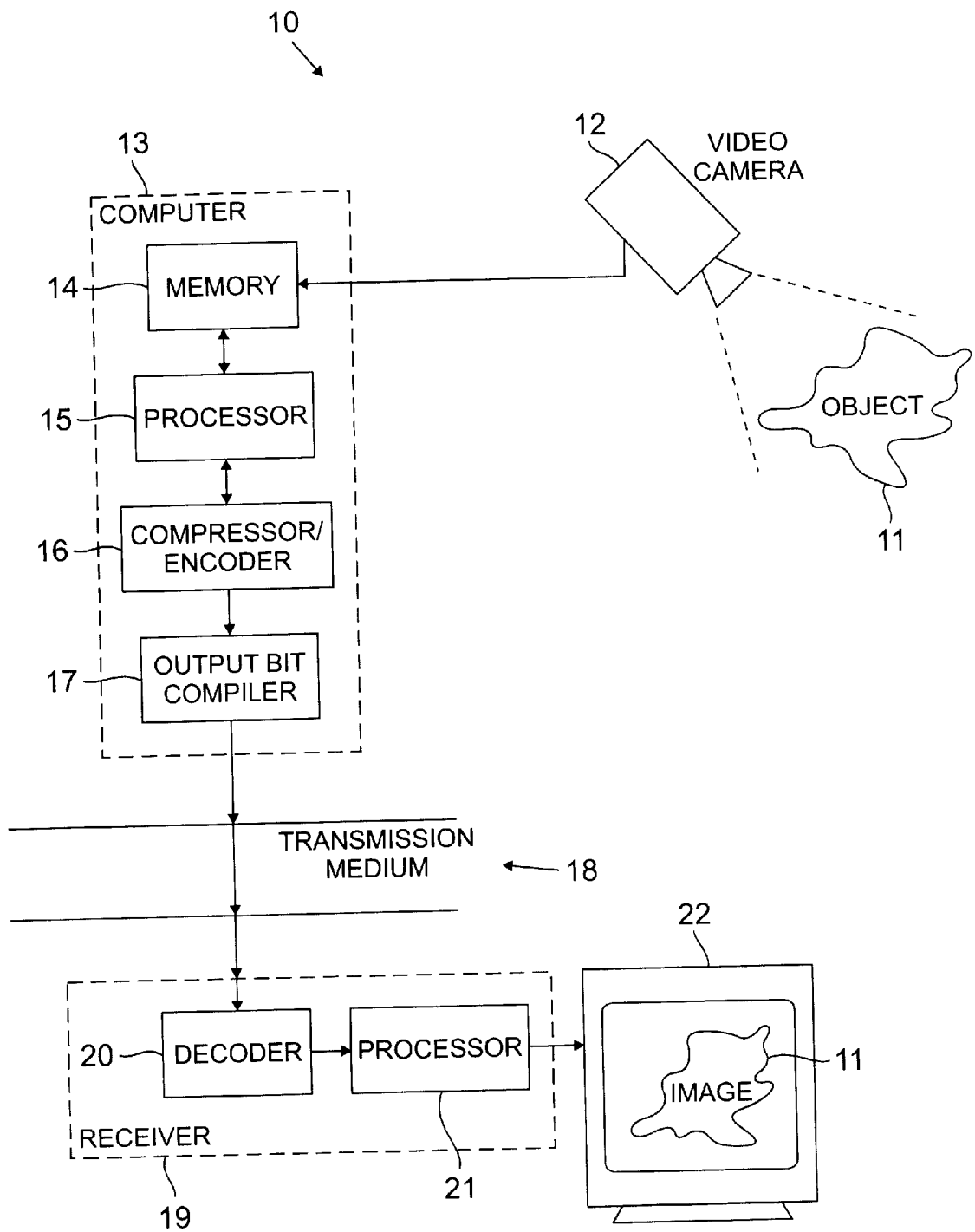
FIG. 1 is a schematic diagram of an end-to-end communication system employing the invention.
Figure 2:
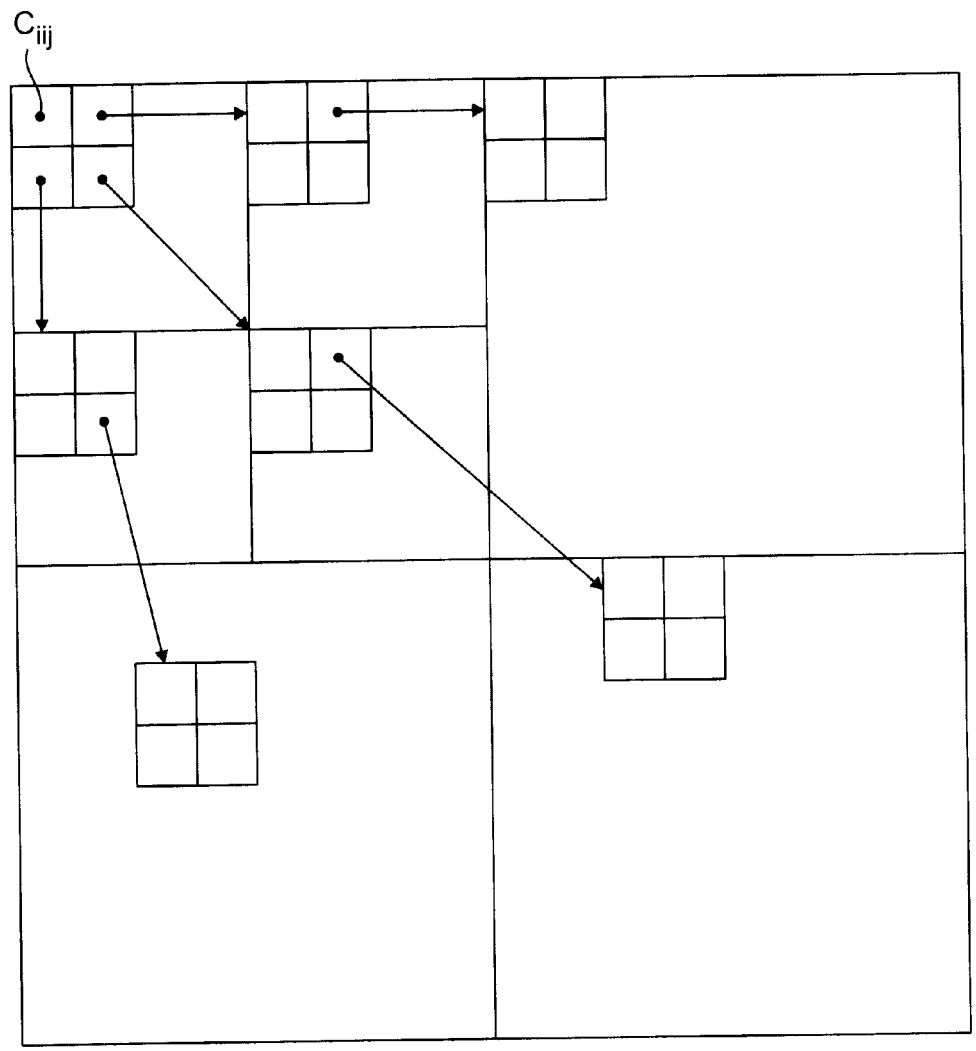
FIG. 2 is a schematic diagram of a data organization showing treeless nodes and nodes with dependencies, depicting the quarternary tree organization resulting from a Wavelet transform.

Referring to FIG. 1, an end-to-end video system 10 is presented by which an original image 11 is acquired by a video camera 12 running a conventional 2-D scan. The scanning generates an uncompressed original set of pixel coordinate values which is coupled to a computer 13 where the coordinates are recorded in a memory 14. A subband decomposition of the memory content is performed in an associated processor 15 resulting in a 2-dimensional array $c_{ij}$ as seen in FIG. 2. Processes for subband decomposition are well-known; an exemplary description is found in U.S. Pat. No. 5,321,776 issued June 1994. The subband decomposition results in a pyramid of matrices and submatrices of wavelet coefficients depicted in FIG. 2. The wavelet coefficients are arranged in hierarchical trees of different levels. A process, operating in computer 13 in the structure denoted compressor/encoder 16, compresses the pixels of the subband decomposition. In accordance with the invention, a novel data traversal and bit-reordering process is performed on the coefficients. The resulting bit stream is sequenced in output bit compiler 17 and transmitted through a transmission medium 18 to a remote receiver 19. There, the bit stream is decoded/decompressed in a decoder 20. The uncompressed original image is compiled and synthesized in processor 21. The reconstructed image is displayed on a monitor 22. Computer 13 must be fast enough to support bit operations. A Sun UltraSPARK™ 60 Workstation with dual 450 MHZ processors may be adapted to run the process. Receiver 18 may be a cable or wireless modem, or a hard drive.

The novel data traversal and bit-reordering processes will next be described.

DATA ORGANIZATION AND SIGNIFICANCE

The Wavelet transform naturally results in a hierarchical ordering of Wavelet coefficients (the subband pyramids) into trees, such that the input data dependency of a parent node is identical to the union of the input data dependency of its children. Thus, for a given wavelet decomposition, a set of treeless nodes (the low-pass filter outputs) are obtained, together with a forest of trees with a branching factor of 4 in the example. Other branching factors may be used including those which are a function of level or subband.

In the hierarchical tree data organization shown in FIG. 2, the magnitude of the coefficients tends to decrease with depth in the tree. This property is advantageously utilized by the encoding scheme. The coding is quantified by the following definitions of "significance" for sets of Wavelet transform coefficients expressed in binary language. (While more general thresholds could be used, a binary decomposition is of primary interest for practical realizations). Given an integer value v, and its binary expansion $$|V| = 2^{b-1} + \sum_{i=1}^{b-1} V_i 2^{i-1}, V_i = 0, 1, \quad (1)$$

we define the position of the most significant bit to be $$B(v) = b. \quad (2)$$

Thus, in our definition, bit positions are counted from 1. For a set of numbers V, we similarly define the position of the most significant bit $$B(V) = \max_{v \in V} B(v). \quad (3)$$

For simplicity, we further define $$B(\emptyset) = 0. \quad (4)$$

For the Wavelet coefficient hierarchical trees, two sets are of particular interest: the set $D_1(v)$ of all descendants of a particular node v, and the set $D_2(v)$ of all grandchildren and their descendants of a particular node v. These are denoted by:

$$B_1(v) = B(D_1(v)), B_2(v) = B(D_2(v)). \quad (5)$$

Accordingly, we define the significance of a coefficient v to be the bit-plane b such that $B(v)=b$, and similarly, the significance of a set V to be the bit-plane such that $B(V)=b$.

SIGNIFICANCE ENCODING

Figure 3A:
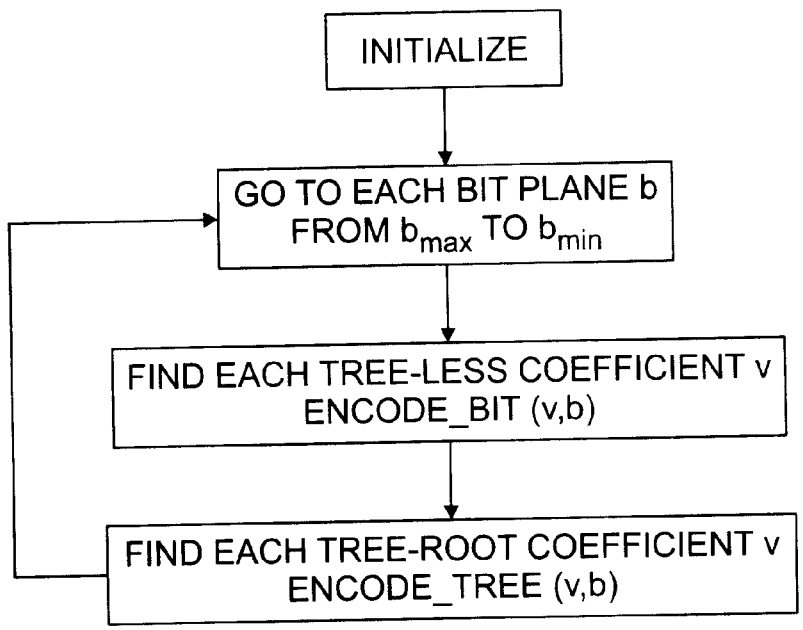
FIG. 3a is a flow chart exemplifying traversal of all tree-less nodes and all trees in a predetermined order.
Figure 3B:
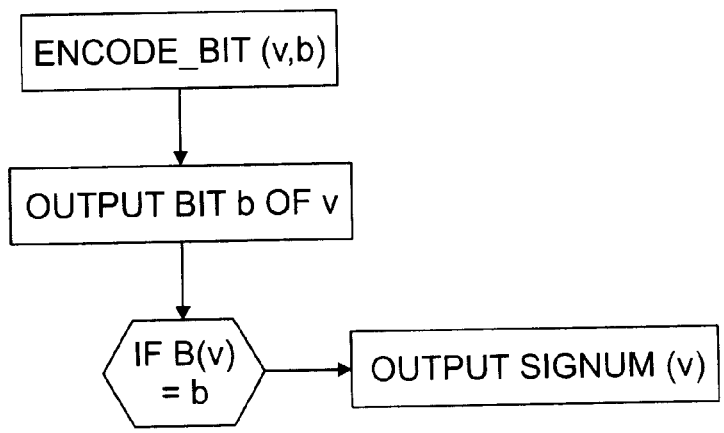
FIG. 3b is a flow chart showing emission of part of a wavelet coefficient value for the current bit-plane.

The compression achieved by the processes of the present invention results from traversing the trees of FIG. 2. From the traversal, emitted bits are generated which describe the relative magnitude of coefficients in the sub-trees of the current node v. It is advantageous that the significance encoding herein described is consistent with the "zero-tree" encoding of SPIHT. Referring now to the flowchart of FIGS. 3a and 3b, and to the process statements in Appendix A, encoding bits are produced at nodes in a tree as a function of the significances defined for the node, a given bit-plane b, and whether the parent node still emits $B_2(v)$ bits. Given a bit-plane b, we emit a bit 0 if $0<B_1(v)<b$, and a bit 1 if $B_1(v)=b$. In the first case, all coefficients in the sub-tree of v have a bit 0 in bit-plane b, and need not be further described. In the latter case, at least one coefficient in the sub-tree below v is significant, and further information is required. Practically, it may be necessary to establish a bit budget for traversing the image as a whole or for a given subtree based on some other cut-off or a figure of merit. Once the budget has been reached, no further encoding need be carried out because of the "embedded" property at work. The result of the process of FIGS. 3a and 3b is a single output stream of bits of values 1,0, depending on results of the significance tests. The nodes are traversed one bit-plane at a time. The minimum bit-plane $b_{min}$ is not necessarily the lowest bit-plane, but rather the bit-plane reached when the output bit budget is reached. The encoded bits are transmitted to the remote receiver 19 where they are uncompressed/decoded.

In FIG. 3b, the output is a coefficient value for the current bit-plane. As will be shown below, the output may include additionally or alternatively: queueing certain output bits into one or more stores for additional processing, outputting the parent $B_1$ value, ot outputting the signum and magnitude bits separately.

Figure 4:
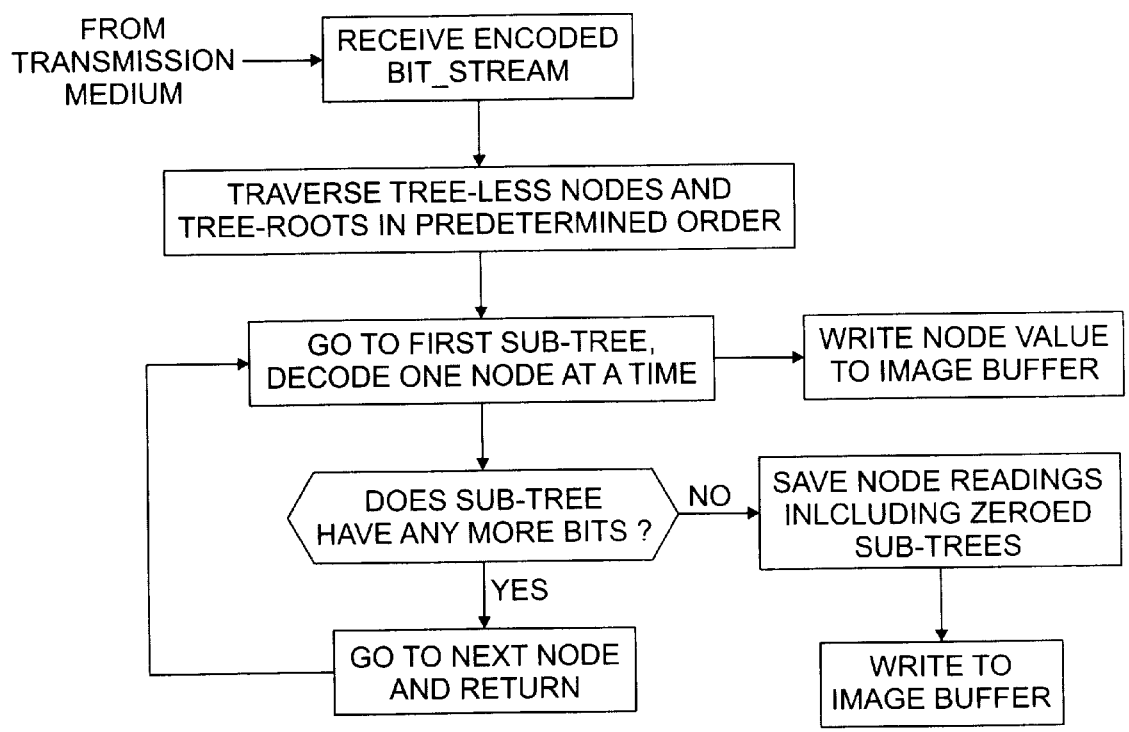
FIG. 4 is a flowchart of a parallelized version of the decoder for the basic process.
Figure 8:
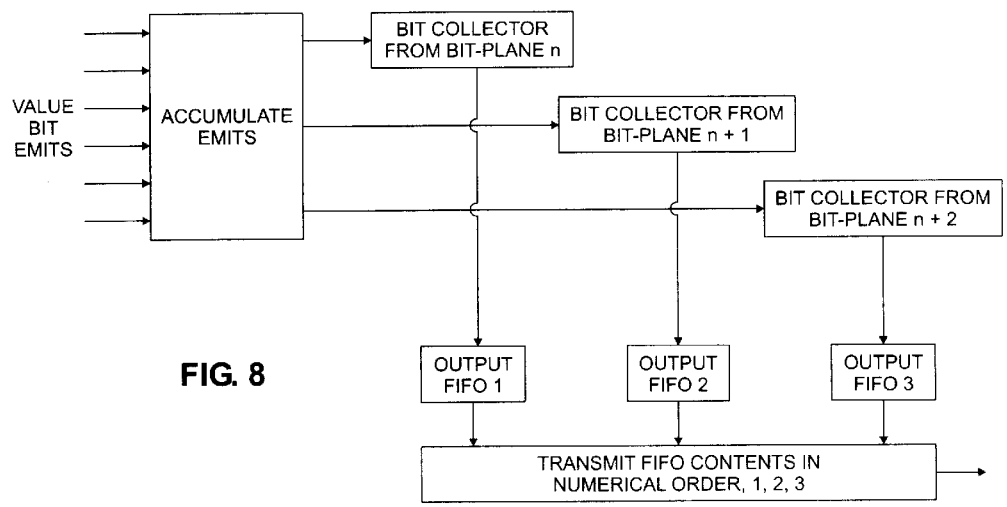
FIG. 8 is a flow chart of an alternative traversal in which a bit output collector collects emits as a function of bit-plane number.

Decoding is essentially the inverse of encoding; and is achieved in decoder 20 by reconstructing the significances and the coefficient values. The objective is to not write any nodes until all their bits are known. As shown in FIG. 4, the encoded bit-stream is received and a traversal of treeless nodes and tree roots is effected. Then, in a sequence, a first subtree is decoded, one node at a time. If the subtree is found not to be significant at any of the available bit-planes (i.e., when the data has been exhausted or the subtree still has significance 0 in bit-plane 1) it is zeroed. The resulting node readings, including zeroed nodes, are saved. The array is inverse-transformed in decoder 20 to recover the original image. This process then repeats for further subtrees and nodes. If all bits from a given node cannot be examined in one operation, then partial results may be saved and re-read as illustrated in FIG. 8, hereinafter.

The above processes very efficiently encode the relative magnitudes of the coefficients in a tree. The values associated with child nodes of a node v must be transmitted explicitly for all bit-planes such that $B_1(v) \geq b$.

DATA TRAVERSAL AND BIT REORDERING

The encoding scheme described above specifies all bits emitted by a given node v as a function of the bit-plane b, the associated coefficient value v, the significant bit positions $B_1(v)$ and $B_2(v)$, and the parameters of the ancestors of the node. That is, if the node emits bits it either emits B(v) bits only, or all bits-depending on the ancestor parameters. It therefore is inherent that the computation of these bits may be performed in parallel. Further, the user may elect, for example, to encode certain sub-trees only; or choose to refine some subset of nodes.

As noted, decoding is achieved by reconstructing the significances. This imposes some restrictions on bit order: the decoding process must reconstruct $B_1(v)$ before specific bits of the children of v can be identified; and must reconstruct $B_2(v)$ before further sub-tree information can be processed. Further, for any given node, bit-plane information must be obtained in order, from highest bit-plane to lowest. Advantageously, given these conditions, this class of algorithms can be embedded.

Different data-traversal algorithms in the encoder will produce the encoded bits in different orders. As earlier noted, the simplest and usually preferred method is to traverse the treeless nodes and the trees in a predetermined order, one bit-plane at a time, with the recursive process of Appendix A.

Figure 5:
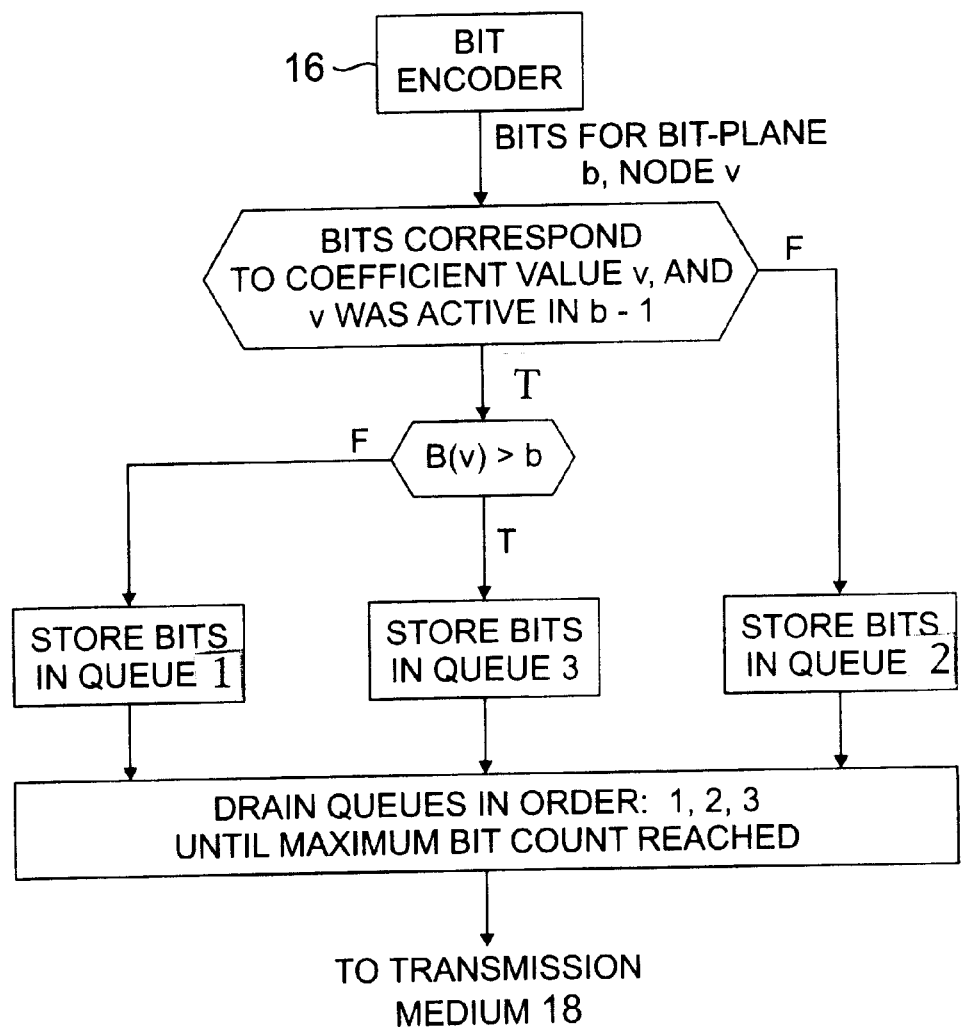
FIG. 5 is a schematic diagram showing an exemplary post-processing operation.

Since the origins of bit encoder outputs are readily identified, further processing based on the characteistics of the bits is readily accomplished. Of particular interest is a postprocessor that delimits the bit-planes as, for example, by prepending a bit-count to each bit-plane queue, or by using arithmetic coding on each bit-plane stream and terminating each with an end of symbols marker. A postprocesssor used to reorder the bit-encoder output stream is shown in FIG. 5.

A division is made of the bit-stream in a given bit-plane b into three bit groups, based on: a) whether the bits correspond to coefficient value bits for nodes v that were active in the previous bit-plane, in which case these bits are directed to output storage queue 1 if B(v)=b, or if not these bits are directed to a output storage queue 3; and b) directing all other bits to output queue 2. On final output, the queues are drained in numerical order, with a cut-off applied when a pre-established maximum bit count is reached.

Figure 6:
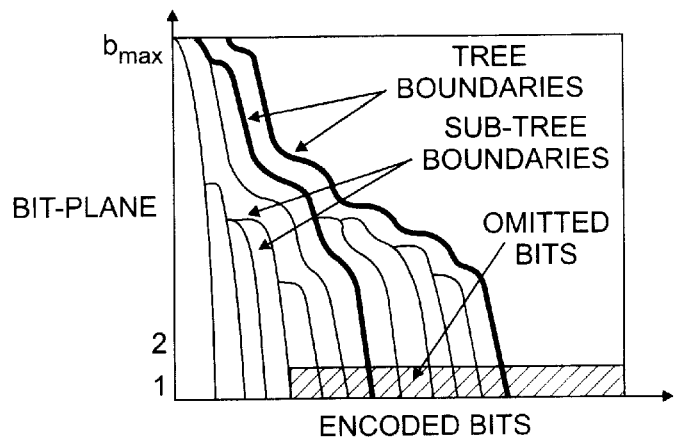
FIG. 6 is a diagram illustrating originating nodes for bits in encoder output stream as a function of bit-plane and bit number of reference.

In order to support alternatives to emitting bits in the order in which they are generated, it is sometimes useful to bound the outputs generated, as illustrated in FIG. 6 and in the description below. For the particular decoder described in Appendix B, for example, it is necessary to convey bit-plane boundaries to the decoder.

For a tree of S levels and branching factor 4, we have a maximum bit count $C_b$ in bit-plane b given by:

$$C_b \leq \frac{4}{3}(4^S-1) - 2 \cdot 4^{S-1} - 4^{S-2} \text{ bits}, \qquad (6)$$

a bound reached when each node emits a sign bit, a value of the bit in the current bit-plane, a $B_1$ bit and a $B_2$ bit. (The negative terms in Eq. 6 account for the fact that nodes in the next to last layer do not emit $B_2$ bits, while nodes in the last layer of the tree emit neither $B_1$ nor $B_2$ bits.)

Across all bit planes, each node emits only one sign bit, and emits $B_1$ and $B_2$ bits only once for the maximum count to be reached. Thus, with K bits per node, a tree emits at most $$C \leq \frac{4^S-1}{3}(K+3) - 2 \cdot 4^{S-1} - 4^{S-2} \text{ bits}. \qquad (6)$$

The bit-plane boundary marking may be implemented in the output queues by preceding transmitted bits with a bit-count however encoded; or by further encoding the the outputs followed by an end-of-bit plane marker.

Figure 7:
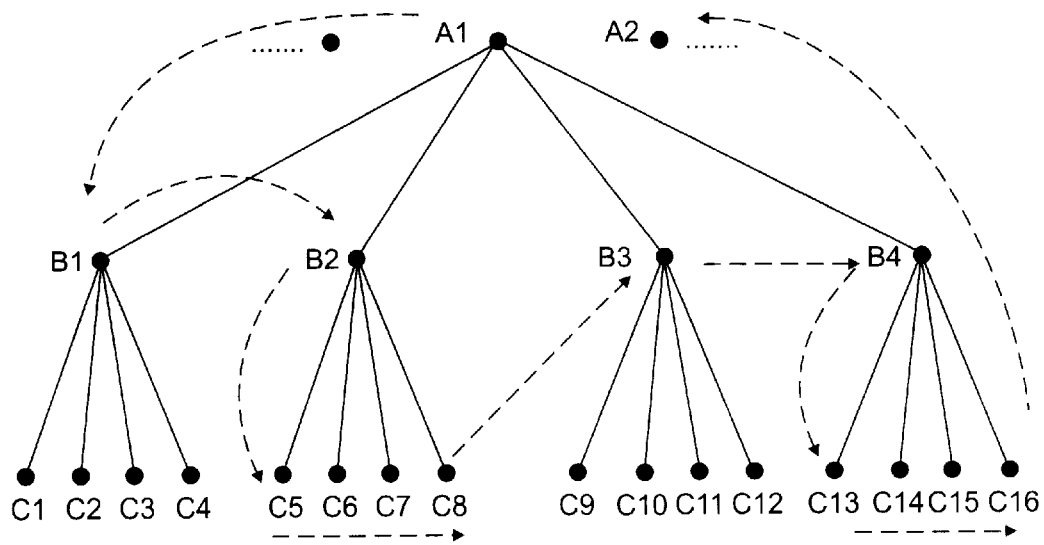
FIG. 7 is a process sequencing diagram characterizing traversal by "siblings first, subtrees next"

The reference process shown in FIGS. 3a, 3b and expressed in recursive form in Appendix A, is a "depth-first" traversal scheme in which all nodes of a given tree are traversald and then sibling trees of the given node are traversed. An alternative traversal scheme, which is presently preferred for its advantages given current DRAM hardware, is exemplified in FIG. 7 where the sibling nodes B1, B2, B3, B4 are children of node A. The nodes C1, C2, C3, C4 are a four-tuple children set of node B1; and likewise, the nodes C5–C8, C9–C12, and C13–C16 are respectively four-tuple children sets of nodes B2, B3, B4. With the current node being node A1, a transition is made to examine in sequence the Wavelet coefficients and significances of nodes B1, B2, B3, B4. The emits from this traversal are collected and queued. With traversal of the sibling nodes B1–B4 complete, the process returns to traverse in sequence the nodes C1–C4, C5–C8, C9–C12, and C13–C16 as required by the significance test results for node B1 in the example. Rather than re-reading these parameters and re-deriving the required traversal sequence, corresponding state bits are maintained on a Stack, with bits pushed as a result of the tests performed, and "popped" when a transition between nodes is effected. The emits from this step are collected and queued.

The preceding operations require a Stack to maintain the necessary state variables. Thus, for further example, the Stack retains node A1 environment during the examining of the wavelet coefficients of the sibling nodes B1–B4. The Stack entry pushed as part of the A1-to-B1 transition must encode a transition (pointer) to node A2 as the next operand. Similarly, for example, the Stack retains a pointer to node B3 at the time the B2 environment is pushed onto the stack in order that the "POP" operation, after processing of node C8 is completed, returns "A1" parent parameters and node B3 as the next operand. When the descendents of the last member of a 4-tuple are examined, a special rule applies. For example, in the B4-to-C13 transition, the Stack is not pushed, but the parent state memory is gated to reflect B4 status as the nodes C13–C16 are examined. The "POP" operation following completion of examination of node C16 returns the operand A2 and its environment; and the traversal process is continued.

A useful alternative, shown in FIG. 8, to emitting bits in the order in which they are generated, is to put bits into appropriate output FIFOs (e.g., one FIFO per bit-plane), and to drain the output FIFOs in order. Specifically, the bits are reordered by writing them into different output FIFOs, wherein explicit value bits go to FIFO b if $B(v)=b$. The FIFOs are drained in numerical order, one bit-plane at a time until some predetermined bit budget is reached. Input FIFOs at the receiver 19 or their functional equivalent, for example, transmitted bit-plane boundary information, are required to receive the outputs. The transmission may occur as soon as all bits in a given bit-plane have been produced (here, prepend a bit count); or as soon as bits are produced (here, append a bit-plane boundary marker).

A further use of reordering the bits emitted is to exploit the data statistics further (e.g., signs in a subband), by applying, for example, arithmetic coding to different parts of the LIFTS encoder 16 output. A straight-forward realization is to encode subbands and signs separately.

DECODER IMPLEMENTATION

Given the particular algorithm chosen to run the processes of encoder 16, it is of interest to analyze the location of the bit data within the bit stream emitted. For the reference process of Appendix A, for example, the bits for every tree are emitted in turn, one bit-plane at a time. For lower bit-planes, previously active nodes will continue to emit bits, while new nodes may add bits in turn.

Since the traversal algorithm is fixed, and since values of the parent nodes determine whether (and at what bit-plane) children start contributing, it is readily appreciated that individual nodes may be reconstructed completely, one at a time, to the extent that bits are available. The decoder process is essentially the inverse of the encoder process depicted in FIGS. 3a, 3b. By way of example, at the encoding stage, trees are traversed and output bits are encoded one bit-plane at a time (as by looking at each active node once per bit-plane). At the decoder, however, trees may be reconstructed at one node across all bit-planes at a time. This approach obviates need to save partial results; and is the scheme followed by the decoding process stated in Appendix B.

An alternate decoding process to the exact inverse of the Appendix A encoding as is described in Appendix B, requires knowledge of the bit-plane boundaries in the encoded stream. Bit-plane boundary information may be obtained, for example, by having the Appendix A outputs written to a holding area (e.g., a queue), and sending appropriate queue boundary information together with the queue contents once the processing of the bit-plane is complete. FIG. 8 illustrates how this process may be implemented. Bit emits are accumulated, and then separated into sets depending on the bit-plane of origin. The separated bits are stored in output FIFOs, which are drained in order from the highest bit-plane to the lowest through an "encode bit-plane boundary" process.

While the output of encoder 16 may be generated by examining individual nodes in the trees (read-only access), the decoder 20 may require both read and write operations to retrieve and save partially reconstructed values as the algorithm proceeds. However, if the process of FIG. 8 is used, it is not necessary to read partial results: coefficients may be constructed and saved all at once.

Rather than looking at the sub-trees of each child of v and emitting $B_1(v)$ bits accordingly, additional compression may be achieved by first attempting to aggregate all indirect descendants of v, in the manner practiced by the SPIHT process. Once the sub-tree of v has been found to be significant in accordance with the processes of FIG. 3, (namely if $B_1(v) \geq b$,) we emit a bit 0 if $0 < B_2(v) < b$, and a bit 1 if $B_2(v)=b$. While this step may be repeated with aggregates of more remote descendants, it is equally effective to have child nodes emit bits describing their sub-trees (i.e., emitting $B_1(\cdot)$ bits) once $B_2(v) \geq b$.

PERFORMANCE

FIG. 9 is a table comparing PSNR values achieved in tests of the SPIHT and LIFTS reference algorithms. The two processes transmit identical information (only the ordering of the bits is different); and hence achieve identical performance at bit-plane boundaries. With random cut-off points, the reference algorithm suffers a slight performance degradation compared to SPIHT. The test set of 26 HDTV and 6 SDTV color images showed an average loss in PSNR of 0.38 dB for a six step non-standard Wavelet decomposition and a compression ratio of 8:1. LIFTS achieves this performance at greatly reduced computational complexity, greatly reduced memory requirement and reduced data access overhead since the lists have been eliminated, and all output bits for a given coefficient are produced as soon as that coefficient is examined.

APPENDIX A

A recursive version of the process, with depth first traversal and a single output queue in pseudo-code.

Traversal all treeless nodes and all tree roots

```
for each bit_plane from b_max to 1 {
  for each treeless coefficient v {
    encode_bit ( v, b )
  }
  for each tree root v encode_tree( v, b )
}
```

Treat current node, and descend in tree when appropriate

```
encode_tree( node v, bit_plane b ) {
  encode_bit (v,b)
  if b > B_1 (v)
  else if b = B_1 (v)
  if b = B_1 (v) {
    output 1
    if B_2 (v) = 0 {
      encode_children ( v, b )
    } else if b = B_2 (v) {
      output 1
      encode_sub_trees ( v, b )
    } else {
      output 0
      encode_children ( v, b )
    }
  } else if b < B_1 (v) {
    if B_2 (v) = 0 {
      encode_children ( v, b )
```

APPENDIX A-continued

A recursive version of the process, with depth first traversal and a single output queue in pseudo-code.

```
    } else if b > B_2 (v) {
        output 0
        encode_children ( v, b )
    } else if b = B_2 (v) {
        output 1
        encode_sub_trees ( v, b )
        encode_sub_trees ( v, b )
    }
  }
}
```

Encoder Bit Output:

```
encode_bit ( node v, bit_plane b ) {
    output bit b of v
    if B (v) = b output signum(v)
}
```

Encoder Child Traversals:

```
encode_children ( node v, bit_plane b ) {
    for each child c of v encode_bit( c, b )
}
encode_sub_trees ( node v, bit_plane b ) {
    for each child c of v encode_tree ( v, b )
}
```

APPENDIX B

A parallelized version of the decoder for the reference algorithm reconstructs the Wavelet coefficients one at a time by separately accessing bits from every bit-plane.

Traversal all treeless nodes and all tree roots

```
for each treeless coefficient v {
    v = 0
    for each bit_plane b from b_max to 1 {
        decode_bit ( v, b )
    }
}
for each tree root v {
    v = B_1 (v) = B_2 (v) = 0
    decode_node ( v, b_max, b_min )
    for each child c of v {
        if B_1 (v) = 0 zero_sub_tree ( c )
        else decode_sub_tree ( c, B_1 (v), B_2 (v))
    }
}
```

Zero a sub-tree:

```
zero_sub_tree ( v ) {
    v = B_1 (v) = B_2 (v) = 0
    for each child c of v zero_sub_tree ( c )
}
```

Decode a sub-tree: Recursively descend in the tree

```
decode_sub_tree ( v, b_1, b_2 ) {
    v = B_1 (v) = B_2 (v) = 0
    for each bit_plane b in [b_1, b_2) {
        decode_bit ( v, b )
    }
    decode_node ( v, b_2, b_min )
    for each child c of v {
        if B_1 (v) = 0 zero_sub_tree ( c )
        else decode_sub_tree ( c, B_1 (v), B_2 (v))
    }
}
```

Decode a node: Get all traversal bits

```
decode_node ( v, b_1, b_2 ) {
    for each bit_plane b in [b_1, b_2] {
        decode_bit ( v, b )
        if B_1 (v) = 0 {
            input bit from bit_plane b
            if bit = 1 {
```

APPENDIX B-continued

A parallelized version of the decoder for the reference algorithm reconstructs the Wavelet coefficients one at a time by separately accessing bits from every bit-plane.

```
                B_1 (v) = b
                if v has grandchildren {
                    input bit from bit_plane b
                    if bit = 1 { B_2 (v) = b }
                }
            }
        } else if v has grandchildren {
            if B_2 = 0 {
                input bit from bit_plane b
                if bit = 1 { B_2 (v) = b }
            }
        }
    }
}
```

Decoder Bit Input

```
decode_bit ( node v, bit_plane b ) {
    if B (v) = 0
        input bit b of v from bit_plane b
        if bit = 1 input signum(v)
    } else {
        input bit b of v from bit_plane b
    }
    if v ≠ 0 {
        round by setting bit b-1 of v to 1
    }
}
```

What is claimed is:

1. In an imaging system using Wavelet-based image compression, a process for generating a compressed bit stream comprising the steps of:
   a. performing a sub-band decomposition of data representing a source image into hierarchical tree data sets contained in bit-planes, each node of each tree in said tree data set containing a Wavelet coefficient and associated parameters;
   b. traversing a predetermined sequence of trees and subtrees in said tree data set and examining a data-dependent sequence of tree and subtree nodes to detect defined parameters including the identity of the bit-plane, and the significant bit positions $B_1(v)$ and $B_2(v)$ associated with said Wavelet coefficients at said nodes;
   c. for each said node, emitting at least one bit characterizing the Wavelet coefficient and its associated parameters as soon as said node is examined; and
   d. compiling said emitted bits in an output bit stream by channeling into a first output queue produced bits if the current said node was already emitting value v bits in the previous plane and if B(v) is the current bit plane; channeling into a second output queue produced bits if the current said node was already emitting value v bits in the previous plane but B(v) is not the current bit plane and the current said node was already emitting value v bits in the previous plane; writing all other bits to a third output queue; and transmitting sequentially the contents of said first, second and third output queues.

2. In an imaging system using Wavelet-based image compression, a process for generating a compressed bit stream comprising the steps of:
   a. performing a sub-band decomposition of data representing a source image into hierarchical tree data sets contained in bit-planes, each node of each tree in said tree data set containing a Wavelet coefficient and associated parameters;

b. traversing a predetermined sequence of trees and subtrees in said tree data set and examining a data-dependent sequence of tree and subtree nodes to detect defined parameters including the identity of the bit-plane, and the significant bit positions $B_1(v)$ and $B_2(v)$ associated with said Wavelet coefficients at said nodes;

c. for each said node, emitting at least one bit characterizing the Wavelet coefficient and its associated parameters as soon as said node is examined;

d. emitting bit-plane boundary data;

e. accumulating and separating all said emitted bits in output FIFOs depending on the bit-plane of origin;

f. draining said output FIFOs in order from the highest said bit_plane to the lowest said bit_plane into an output bit stream;

g. transmitting said output bit stream to a decoder; in said decoder, traversing treeless nodes and tree nodes represented in said bits;

h. for tree nodes, decoding successive subtrees one node at a time to determine whether individual said subtrees are significant at any of their said bit-planes;

i. saving the resulting node readings in an array; and j. inverse-transforming said arrays to recover said source image.

3. In an imaging system using Wavelet-based image compression, a process for generating a compressed bit stream comprising the steps of:

a. performing a subband decomposition of an image to create wavelet coefficients represented by an ordered set of bits in a plurality of bit_plains;

b. said wavelet coefficients being arranged in a set of hierarchical trees of parent and child nodes, one per tree node, and a set of subtreeless nodes;

c. said decomposition being such that the input data dependency of any given parent node in said tree includes the input data dependency of the child nodes of said given parent node;

d. defining the set $D_1(v)$ of all descendants of any given node v in any one of said trees;

e. defining the set $D_2(v)$ of all grandchildren of said given node v and their descendants;

f. traversing all nodes in each tree from the lower-most said children nodes to the said parent node, and for each node traversed, precomputing the associated significance parameters $B_1(v)=B(D_1(v))$ and $B_2(v)=B(D_2(v))$;

g. defining the significance parameter $B(v)$ of the wavelet coefficient associated said nodes v to be the position of its most significant bit;

h. traversing treeless nodes and trees in a predetermined order based on a specification of the number of bit-planes to be treated at a time, and emitting bits 0 and 1 for each of the nodes visited, as determined by the wavelet coefficient and the $B_1(v)$ significance parameter alone or the $B_1(v)$ and $B_2(v)$ significance parameters together that are associated with each of said nodes;

i. determining the exact bits and exact bit order that each particular node emits; and j. assembling into a single stream said bits of values 1,0.

4. The process of claim 3, wherein said traversing step comprises traversing all treeless nodes and all trees in a data-dependent order, one or more bit planes at a time.

5. The process of claim 4, wherein said traversal step further comprises traversing subtrees of a given node and thereafter traversing siblings of said given node.

6. The process of claim 5, wherein said traversal step further comprises traversing siblings of a given node, and thereafter traversing subtrees of said given node.

* * * * *

UNITED STATES PATENT AND TRADEMARK OFFICE
CERTIFICATE OF CORRECTION

PATENT NO. : 6,549,673 B1
DATED : April 15, 2003
INVENTOR(S) : Egbert Ammicht et al.

It is certified that error appears in the above-identified patent and that said Letters Patent is hereby corrected as shown below:

Column 1,
Line 6, the following statement should be added:
-- STATEMENT REGARDING FEDERALLY SPONSORED RESEARCH OR DEVELOPMENT
This Invention was made with U.S. Government support under Agreement No. NMA202-97-9-1050 awarded by the National Imagery and Mapping Agency. The U.S. Government has certain rights in the invention. --.

Signed and Sealed this

Twenty-seventh Day of September, 2005

JON W. DUDAS
*Director of the United States Patent and Trademark Office*